Patented Jan. 27, 1925.

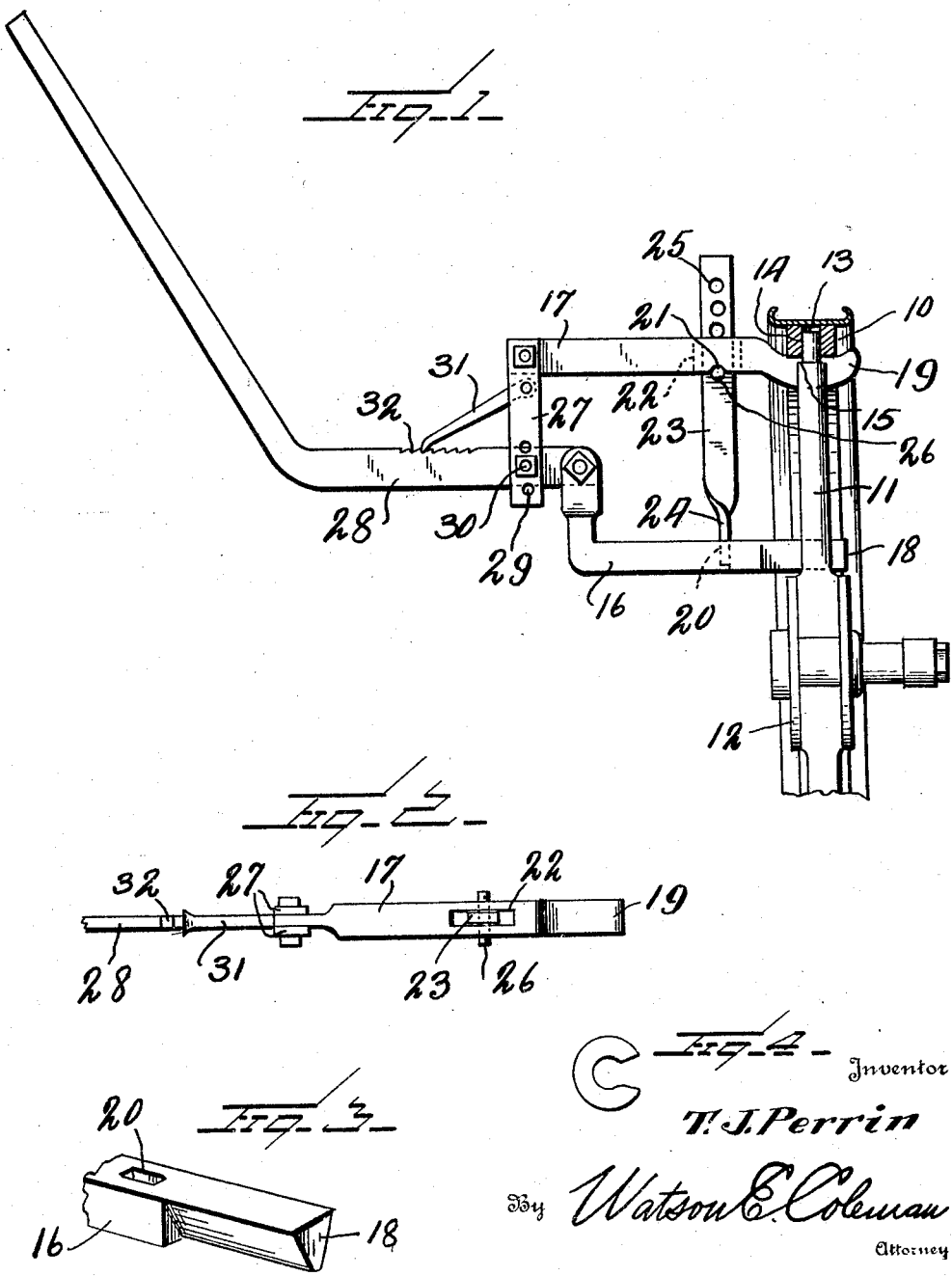

1,524,308

UNITED STATES PATENT OFFICE.

THOMAS J. PERRIN, OF CLARKSVILLE, TEXAS.

EXPANDING DEVICE.

Application filed October 30, 1924. Serial No. 746,854.

*To all whom it may concern:*

Be it known that I, THOMAS J. PERRIN, a citizen of the United States, residing at Clarksville, in the county of Red River and State of Texas, have invented certain new and useful Improvements in Expanding Devices, of which the following is a specification, reference being had to the accompanying drawings.

This invention relates to an expanding device, and more particularly to a device adapted to expand wheels and hold the same in expanded position while washers or other means are inserted between the shouldered ends of the spokes and the felly of the wheel to maintain the same in such expanded position.

An important object of the invention is to provide a device of this character capable of exerting considerable pressure to expand the wheel, and so constructed that the wheel is held in expanded position for a desired length of time or sufficient to enable the insertion of the washer or other means employed to retain the expansion.

A still further object of the invention is to provide a device of this character which may be very cheaply and readily produced, which is simple in its operation, and which is a general improvement in the art.

These and other objects I attain by the construction shown in the accompanying drawings, wherein for the purpose of illustration is shown a preferred embodiment of my invention and wherein:—

Figure 1 is a side elevation showing a lever constructed in accordance with my invention applied to a wheel to separate the ends of the spokes and the felly thereof;

Figure 2 is a plan view of the device;

Figure 3 is a perspective view of the lower or inner lever 16;

Figure 4 is a plan view of a washer of the type employed in increasing the effective length of the spoke.

Referring now more particularly to the drawings, the numeral 10 indicates the felly of a wheel, and 11 the spokes assembled about the hub 12 and abutting the inner wall of the felly. These spokes are usually provided with tenons 13 entering mortises 14 formed in the felly. Such spokes, particularly where the felly and spokes are formed of wood, often become loosened during dry weather, shrinking and causing a space to appear between the ends 15 of the spokes and the felly with the result that the wheel becomes loose, weakened and is noisy in its operation. A common method of tightening these wheels which have thus become loosened is to apply about the tenon 13 thereof, upon the end 15 of the spoke, a washer such as shown in Figure 4, which is slotted to permit its engagement about the tenon. It will be obvious that although the first washers inserted might be readily inserted, the last washers inserted, due to the fact that a great deal of play of the wheel has been taken up, will be much more difficult to insert and some strain must be placed upon the wheel to admit of such insertion. In order to place this strain upon the wheel, I provide a pair of levers 16 and 17, the lever 16 having at one end a portion 18 receiving a shoulder between adjacent spokes at the inner or hub end thereof, the lever 17 having a hooked end 19 receiving the felly 10 between the same two spokes. The levers 16 and 17 are provided upon adjacent faces thereof with notches 20 and 21 forming fulcrum seats, and the lever 17 is provided with a slot 22. A fulcrum bar 23 is provided, one end 24 of which seats in the notch 20 of the bar 16, while the opposite end is directed through the slot 22 of the bar 17 and is provided with a longitudinally disposed series of openings 25 adapted for the interchangeable reception of a fulcrum pin 26, the ends of which seat in the notch 21 of the bar 17. The bar 23 thus forms a support having spaced fulcrums and means for adjusting these fulcrums toward and away from one another.

To the free end of the lever 17, at opposite sides thereof, are pivotally connected a pair of links 27, while to the free end of the lever 16 is pivotally connected one end of a lever handle 28. The free ends of the links are provided with series of spaced openings 29 coacting with an opening formed in the lever 28 for the reception of a pivot pin 30 by means of which the links may be pivotally connected to the lever handle 28. Pivotally connected to the links 27, intermediate the links, is the upper end of a ratchet dog 31, the free end of which coacts with a series of teeth 32 reduced upon the adjacent face of the lever handle 28.

It will be obvious that with a device of this character properly engaged with the wheel, the distance between the fulcrums 24 and 26 being correct and the links 27 being pivotally connected at the proper point with the lever handle 28, but a slight pressure is necessary upon the lever handle to exert a tremendous pressure tending to separate the spokes and felly of the wheel. Once a separation is accomplished, the lever handle may be locked in adjusted position by swinging the dog 31 into engagement with the teeth, so that both hands may be free for the insertion of the washer.

It will furthermore be obvious that the structure hereinbefore set forth is capable of some change and modification without materially departing from the spirit of my invention, and I accordingly do not limit myself to such specific structure except as hereinafter claimed.

I claim:—

1. In an expanding device, a pair of levers each adapted at one end for engagement with one of opposite portions of a member to be expanded, a support extending between the levers and having a fulcrum for each lever, a handle lever, and pivotal connections between the handle lever and the remaining ends of the first named levers at points spaced longitudinally of the handle lever.

2. In an expanding device, a pair of levers each adapted at one end for engagement with one of opposite portions of a member to be expanded, a support extending between the levers and having a fulcrum for each lever, a handle lever, pivotal connections between the handle lever and the remaining ends of the first named levers at points spaced longitudinally of the handle lever, one of said fulcrums being longitudinally adjustable upon the support, and a pivotal connection between said handle lever and one of the first named levers comprising a link pivoted at its ends to said lever and to said handle lever, said link being adjustable as to effective length.

3. In an expanding device, a pair of levers each adapted at one end for engagement with one of opposite portions of a member to be expanded, a support extending between the levers and having a fulcrum for each lever, a handle lever, pivotal connections between the handle lever and the remaining ends of the first named levers at points spaced longitudinally of the handle lever whereby upon movement of the handle lever in one direction the first named ends of the first named levers will be moved in a direction separating the same, and means operatively connected with one of the first named levers and engageable with the handle lever to prevent movement of the handle lever in a direction opposite to said direction.

In testimony whereof I hereunto affix my signature.

THOMAS J. PERRIN.